United States Patent [19]

Graves

[11] Patent Number: 4,928,725
[45] Date of Patent: May 29, 1990

[54] COMBINATION PLUG AND TWO-WAY CHECK VALVE

[76] Inventor: John G. Graves, 3107 Woodward Blvd., Tulsa, Okla. 74105

[21] Appl. No.: 390,279

[22] Filed: Aug. 7, 1989

[51] Int. Cl.$^5$ .......................... F16K 5/06; F16K 15/03
[52] U.S. Cl. ................................ 137/269.5; 137/584; 137/614.17; 251/192
[58] Field of Search ................ 137/269.5, 584, 614.17; 251/192

[56] References Cited

U.S. PATENT DOCUMENTS

| | | | |
|---|---|---|---|
| 1,175,328 | 3/1916 | Wright | 137/614.17 X |
| 1,238,664 | 8/1917 | Groom | 137/269.5 |
| 3,348,569 | 10/1967 | Frye | 137/269.5 |
| 3,474,818 | 10/1969 | Hartman | 137/614.17 X |
| 3,565,099 | 2/1971 | Huber | 137/269.5 |

Primary Examiner—Robert G. Nilson

[57] ABSTRACT

A combination plug and two-way check valve formed of a valve body having a flow passageway therethrough, the body having an opening in the top communicating with the passageway, first and second valve seats in the body, a ball member rotatably received in the body between the seats, the ball having a flow passageway therethrough which is alignable with the passageways in the seats and having a top opening therein communicating with the passageway through the ball, a clapper pivotally supported within the ball and pivotal in a closed position blocking the passageway therethrough in an open position, a bonnet removably closing the body top opening, a stem rotatably received in the bonnet having the inner end connected to the ball, the ball being thereby rotatable to permit the flow of fluid in one direction, the clapper blocking flow of fluid in the opposite direction, and by rotating the ball 180° to permit the flow of fluid in the second direction, the clapper blocking flow in the first direction and wherein the ball may be rotated to a third position wherein fluid flow is blocked in either direction and in which the bonnet may be removed to provide access to the interior of the valve and into the interior of the ball whereby the clapper may be removed and replaced when the valve is in the closed position and subject to fluid pressure.

8 Claims, 4 Drawing Sheets

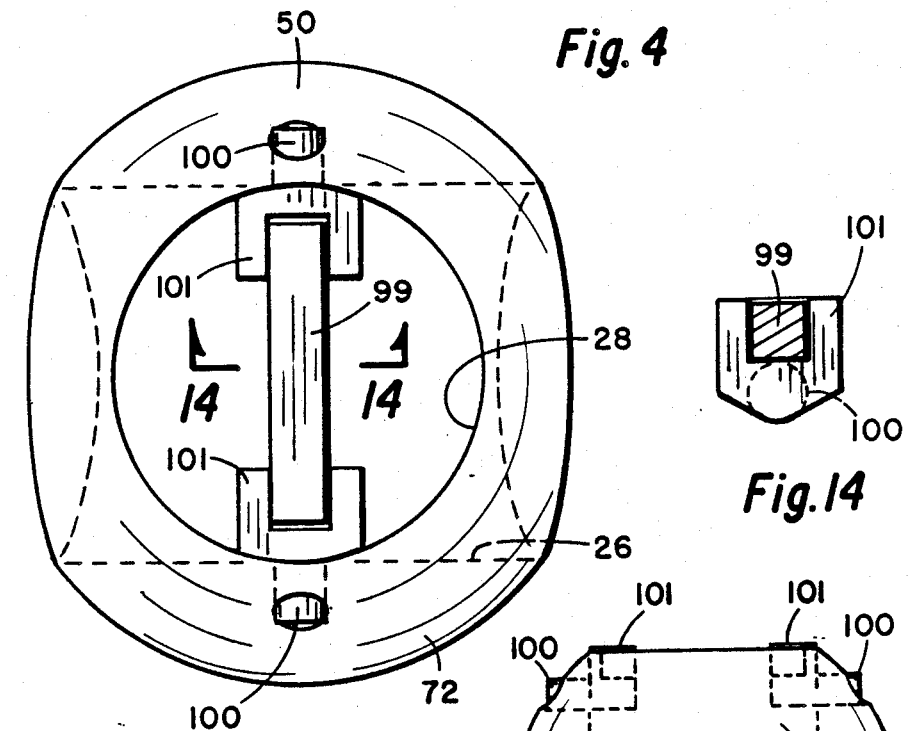
Fig. 4
Fig. 14
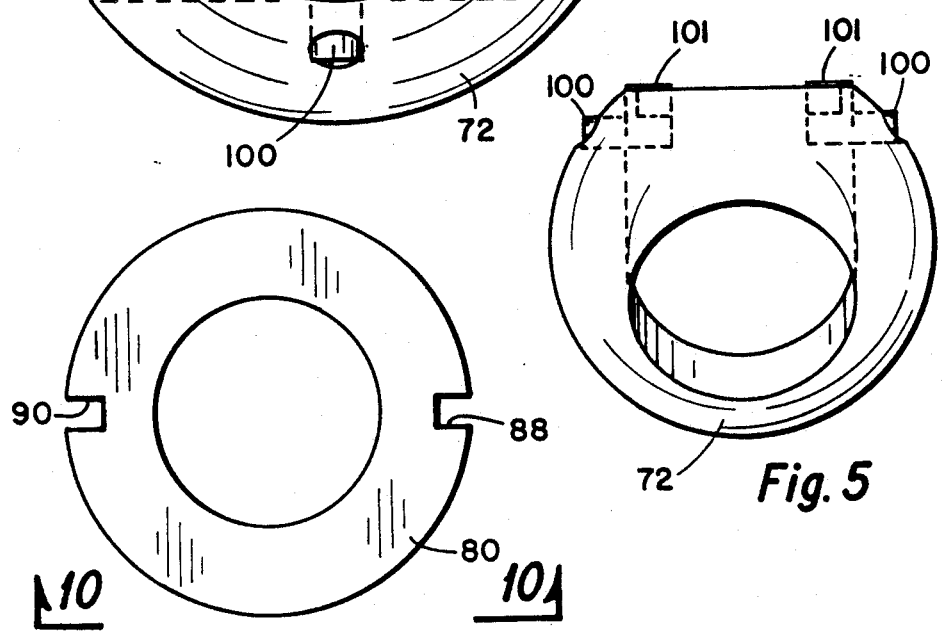
Fig. 5
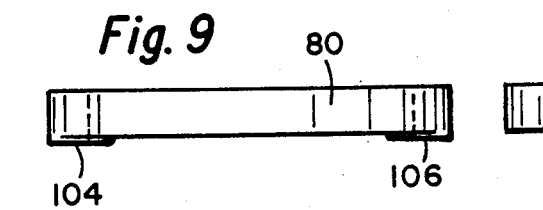
Fig. 9
Fig. 10
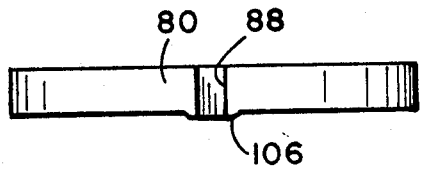
Fig. 11

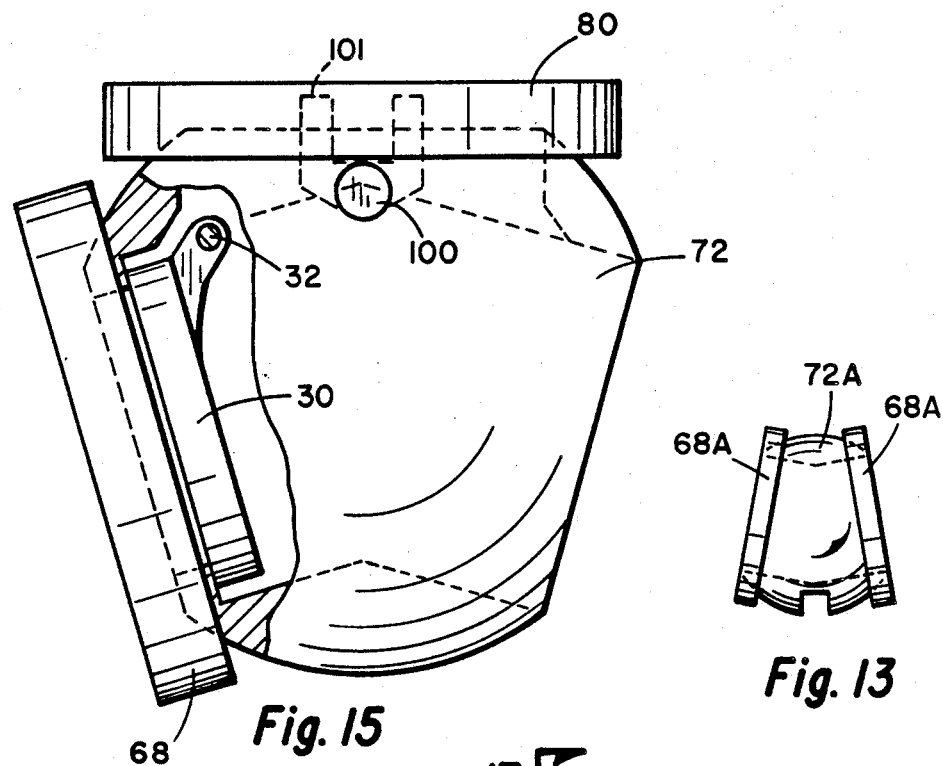
Fig. 15
Fig. 13
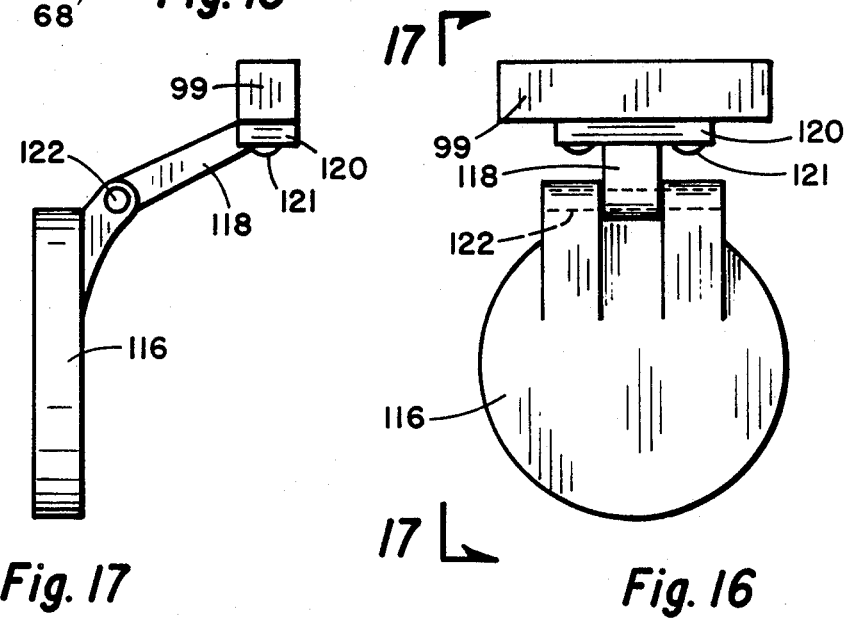
Fig. 17
Fig. 16

COMBINATION PLUG AND TWO-WAY CHECK VALVE

SUMMARY OF THE INVENTION

The use of ball valves is well known as is the use of check valves which include a clapper mechanism for stopping the flow of fluid in one direction but permitting it in another direction. Check valves normally are designed to be unidirectional, that is, permit flow in one direction and block flow in the other direction, and there is no means of reversing this condition without completely removing the valve from its installation and reversing the orientation of the valve.

Others have provided check valves in which the check action of the valve can be reversed, that is, in one condition the valve permits flow in a first direction but prohibits flow in the second direction, and in which the internal orientation of the valve can be reversed so that the valve then permits flow in the second direction but prevents flow in the first direction. For reference to prior art relating to such reversible check valves, reference may be had to the following U.S. Pat. Nos. 3,851,665; 3,474,818; 3,363,650; 1,175,328; 2,151,098; and 3,344,808.

These prior art devices disclose useful basic concepts, but each of the valves shown in these designs have inherent problems. One problem which frequently exists with check valves is that after a period of usage, the clapper or pivotal mechanism within the valve which functions to permit flow in one direction, but blocks it in the other, can become worn, and wear is usually accelerated by the erosion of fluid flow through the valve. In addition, many check valves have clappers with elastomeric seats to obtain complete closure. These elastometric seats can deteriorate. For these and other reasons it is sometimes necessary that the check valve clapper is removed for repair or replacement. In check valves of the without physically removing the valve, a fluid pressure to the valve must be shut-off, otherwise when the valve is open for repair, leakage of fluid is permitted.

The present disclosure is directed towards a valve of the type which provides a check action in either direction, selectable by the user of the valve and which provides complete fluid flow shut-off when desired. In addition to these features, it provides a valve in which the clapper may be removed for repair or replacement while the valve is under fluid pressure and without permitting leakage of fluid.

The combination plug and two-way check valve of this disclosure includes a valve body having a flow passageway through it. Means are provided to connect the valve body to other fluid flow members, such as piping or the like, and this can be accomplished such as by threaded openings in each end of the valve body although instead of threaded openings the valve may be provided with integral flangs or other means of attachment which are well known in industry. The valve body has an opening in the top which communicates with the internal passageway within the body.

A first and a second valve seat are positioned within the valve body. Each seat has a flow passageway through it, and when in position within the valve body, the flow passageways through the seats are in alignment with the flow passageways through the valve body. The seats are spaced apart from each other.

A ball member is rotatably received within the body between the seats. The ball member has a flow passageway through it which is alignable by rotatably positioning the ball with the flow passageways in the seats and the valve body. The ball has a top opening which communicates with the passageway through the ball.

A clapper is pivotally supported within the ball member, and pivotally by fluid flow between a closed position which blocks the flow passageway through the ball and to an open position permitting flow through the ball.

A bonnet is removably secured to the valve body closing the body top opening. The bonnet has a smaller diameter opeing through it. A stem is rotatably positioned within the bonnet smaller diameter opening. The inner end of the stem within the valve body is removably affixed to the ball.

A means, such as a handle or disc, is affixed to the stem externally of the valve body to permit rotation of the stem and thereby the ball within the valve.

The ball is thereby rotatable to a first position wherein the passageway through the ball is aligned with the flow passageway through the body, and fluid flow is permitted through the valve in one direction, the clapper blocking flow in the other direction. The ball may then be rotated 180° to thereby permit flow of fluid in the second direction, but the clapper blocks the flow of fluid in the first direction. The ball may be rotated to a third position in which fluid flow through the valve is blocked in both directions.

In the ball third position, the bonnet, or at least a portion thereof, may be removed exposing the interior of the ball. In this condition, the clapper may be removed from the interior of the ball to be repaired or replaced. This is possible even when the valve is under fluid pressure.

The improved combination plug and two-way check valve of this disclosure thereby provides a valve which has multiple fluid control positions but which is also repairable without removing the valve body from its connection with other fluid carrying components and while the valve is under fluid pressure.

Another feature of this disclosure is the provision of improved sealing contact between the ball and the valve seats. In the preferred arrangement, the seats in the valve body are inclined towards each other in a direction away from the top opening. The seats are free to move with respect to the valve body. By downward force applied against the ball, the seats are displaced in the direction toward each other, achieving additional sealing contact between the ball and the seat.

In another embodiment, the valve includes a top seal and provision is made for increasing the pressure of the ball against the top seal when the ball is in the third or total fluid flow closed position.

A better understanding will be had by reference to the following description and claims taken in conjunction with the attached drawings.

DESCRIPTION OF THE DRAWINGS

FIG. 4 is an enlarged top plan view of the ball of the type employed in the valve in FIG. 6.

FIG. 5 is a reduced scale isometric view of the ball employed in the valve of FIG. 6.

FIGS. 7 and 8 are shown in reduced scale.

FIG. 9 is a top plan view of a top seal employed in the valve of FIG. 6.

FIG. 10 is an elevational view taken along the line 10—10 of FIG. 9.

FIG. 11 is an elevational view of the top seal of FIG. 9 as shown in FIG. 10 but with the seal rotated 90°.

FIG. 13 is an elevational view, in reduced scale, of an alternate arrangement of the valve in which the seals are inclined towards each other in the upward direction.

FIG. 14 is a partial cross-sectional view taken along the line 14—14 of FIG. 4 showing details of the pin supports.

FIG. 15 is an elevational external view of the ball as employed in the valve of FIG. 6, showing one seat and the top seal, and showing a closure disc mounted pivotally within the ball. A valve including the ball of FIG. 15 functions as a combination ball valve and check valve.

FIG. 16 is an end view of a closure disc having an alternate means of pivotally supporting the disc within the ball in which the disc is supported from the ball rotation control pin.

FIG. 17 is a side view of the closure disc taken along the line 17—17 of FIG. 16.

DESCRIPTION OF THE PREFERRED EMBODIMENT

Figure 1:
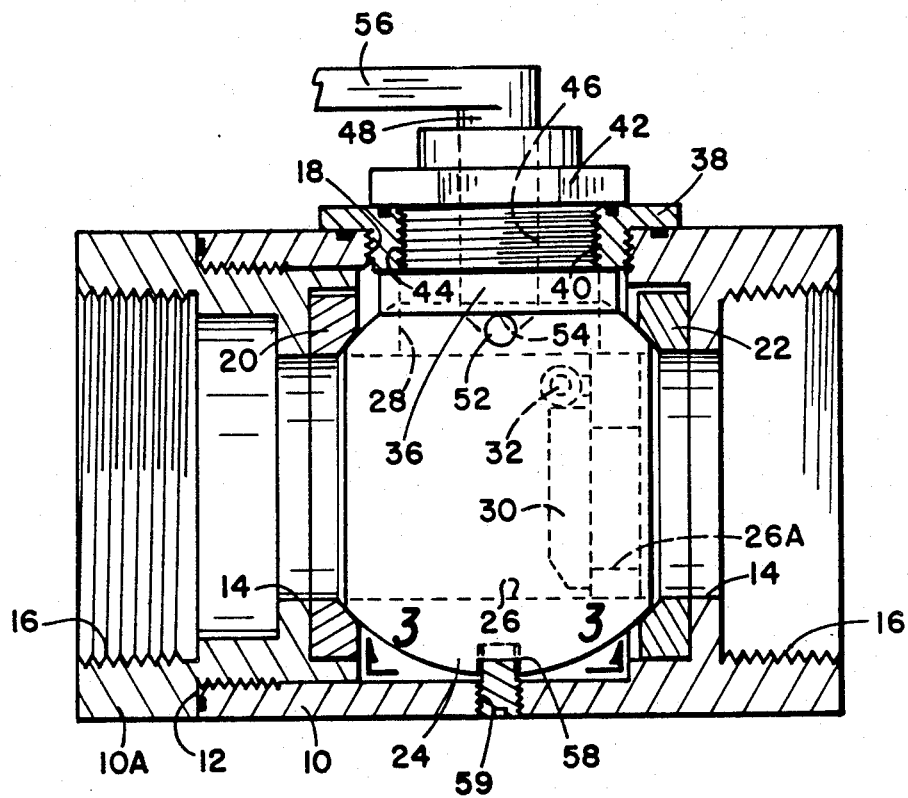
FIG. 1 is an elevational cross-sectional view of one embodiment of the valve of this disclosure providing a combination plug and two-way check valve having means for repair of the valve clapper without removing the valve from fluid pressure.

Referring to the drawings and first to FIG. 1, a valve which exemplifies the principles of this disclosure is shown. The valve is formed of a body made up of two threaded together portions, that is, a first body portion 10 and a second body portion 10A. The first body portion 10 has a threaded end 12 which receives an externally threaded portion of the second body portion 10A. With the portions 10 and 10A threadedly secured to each other, a total valve body is formed having a flow passageway 14 therethrough. The valve body made up of portions 10 and 10A is provided with means for connection to other fluid flow conducting members, such as by the provision of internal threads 16 at each end of the valve body.

Formed in the top of the valve is a top entry 18 which provides communication to the flow passageway 14 within the valve body. The top opening 18 is internally threaded in the arrangement of FIG. 1.

Positioned within the valve body is a first seat member 20 and a second seat member 22. The seats 20 and 22 are spaced apart from each other and are positioned so that they can slide vertically with respect to the body 10 and 10A.

Positioned within the valve body flow passageway 14 and between seats 20 and 22 is a ball member 24. The ball member has a generally spherical external surface and has a flow passageway 26 through it. The ball external sherical surface is in sealed contact with seats 20 and 22.

Ball 24 has a top opening 28 which provides communication with the flow passageway 26.

The interior of ball 24 is configured so that one portion 26A of the flow passageway is of reduced diameter. Positioned within the interior of ball 24, that is, within the flow passageway 26, is a clapper 30 which is pivotally supported to the ball and pivotal about a pin 32. When the clapper 30 is in the closed position as shown in FIG. 1, the reduced diameter portion 26A of the flow passageway is closed.

Ball 24 has a spherical upper sealing surface 34. A top seal 36 is positioned within the valve body and in engagement with the ball upper surface 34.

The top entry 18 of the valve body is closed by an outer bonnet member 38 which is externally threaded to engage the body threaded opening 18. The outer bonnet 38 has an internally threaded opening 40 thereon. The outer bonnet member 38, thus, is annular in shape and engages the top seal 36.

An inner bonnet member 42 having external threads 44 is positioned within the outer bonnet member threaded opening 40. The inner bonnet member 42 has a reduced diameter opening 46 therethrough which rotatably receives a stem 48. The inner end of the stem 48 is attached to the ball 24. This is accomplished as shown in FIG. 4. The ball 24 had a pin 52 in the top portion thereof. The lower end of stem 48 has a recess 54. This recess engages pin 52 so that when stem 48 is rotated force is applied by way of pin 52 to rotate ball 24. A means, such as a handle 56 shown fragmentarily in FIG. 1, is used to rotate stem 48 and thereby position ball 24.

FIGS. 4 and 5 show the arrangement of ball 24 with an offset fluid core and without the internal clapper 30 since the basic concepts of the valve may be employed either as a double acting check valve, or as an improved plug valve with the ball of the type shown in FIGS. 4 and 5 being employed when the valve functions only as a plug valve. It can be seen that the pivotal clapper 30 as shown in FIG. 1 may be employed within the ball as shown in FIGS. 4 and 5 when desired.

It is seen that with the ball 24, oriented as in FIG. 1, fluid can flow through the flow passageway 14 in a first direction, that is, from right to left. Such fluid flow would lift clapper 30 from sealed engagement with its seat within the ball 24. Flow is not permitted in the reverse direction, that is, from left to right. However, if the ball 24 is rotated 180° then the clapper 30 would permit fluid flow from left to right but would block fluid flow in the opposite direction. In addition, the ball 24 may be rotated 90° to a third position wherein the body passageway 14 is blocked against fluid flow in either direction. In such third position, the clapper 30 is not involved in the action of the valve.

In such third position, it can be seen that the inner bonnet member 42 may be threadably removed. This action will result in exposure of the interior of the ball 24. The clapper 30 may then be removed, such as by removing pin 32, and the clapper repaired or replaced as necessary. This can be accomplished even when the other fluid carrying components normally connected to the valve body are under fluid pressure. Thus, the valve described with reference to FIG. 1 provides a valve having three functions, that is, a check valve in a first direction, a check valve in a second direction, and a plug valve. These three functions are provided in a valve in which the clapper which performs the check function can be removed and replaced while the valve is subject to fluid pressure.

Figure 2:
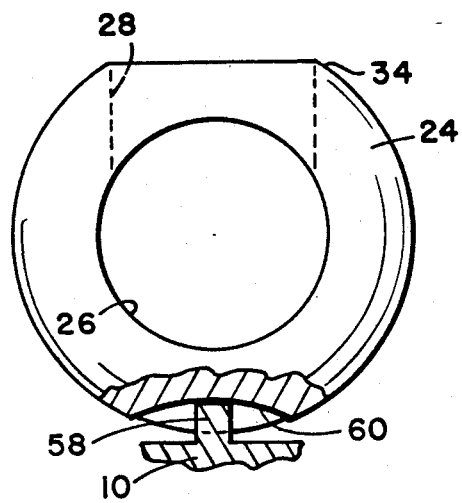
FIG. 2 is a fragmentary elevational view of the valve ball and a small portion of the valve body, a portion of the ball being cut away to show the feature wherein the valve ball is forced upwardly for increased sealing contact with the upper seal when the ball is in the fully closed position.
Figure 3:
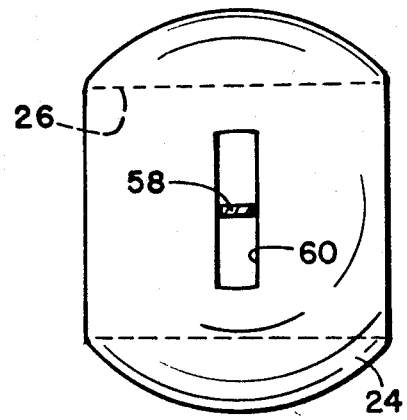
FIG. 3 is a cross-sectional view taken along the line 3—3 of FIG. 1.

When the valve is in the fully closed position, that is, rotated 90° relative to that of FIG. 1, and the inner bonnet 42 is to be removed to permit repair and/or replacement of the clapper 30, it is important that good contact be attained between the ball and top seal 36. A means of insuring this function is illustrated in FIG. 1, 2, and 3. Positioned within the body 10 is an upstanding trunnion member 58 which is of rectangular cross-sectional configuration. Formed in the bottom of ball 10 is an arcuate slot 60. The width of the slot is slightly greater than the cross-sectional length of the trunnion member 58. When the ball 24 is in the position as shown in FIG. 1, the top of trunnion 58 is perpendicular to the length of slot 60, but when the ball is rotated 90° to the position as shown in FIG. 2, the length of the cross-section of trunnion 58 is parallel to that of the arcuate slot 60. Because of the arcuate shape of slot 60 and the rectangular cross-sectional shape of trunnion 58 in the orientation of FIG. 2, the ball 24 is slightly upwardly displaced. This slight upward displacement applies increased contact against the top seal 36 when the ball is in the fully closed position.

FIG. 1 the trunnion member 58 is in the form of an externally threaded member received in a threaded opening 59 in the valve body. The threaded member has a screw driver slot therein by which it can be rotated thereby permitting adjustment of the elevational height of ball 24 within the valve body to adjust for sealing contact of the ball with upper seal 36. The threaded trunnion member 58 can be even more advantageously employed with the concepts of FIGS. 12 and 13 in which upward adjustment of the trunnion member will increase sealing contact between the ball and the flow control seals.

Figure 6:
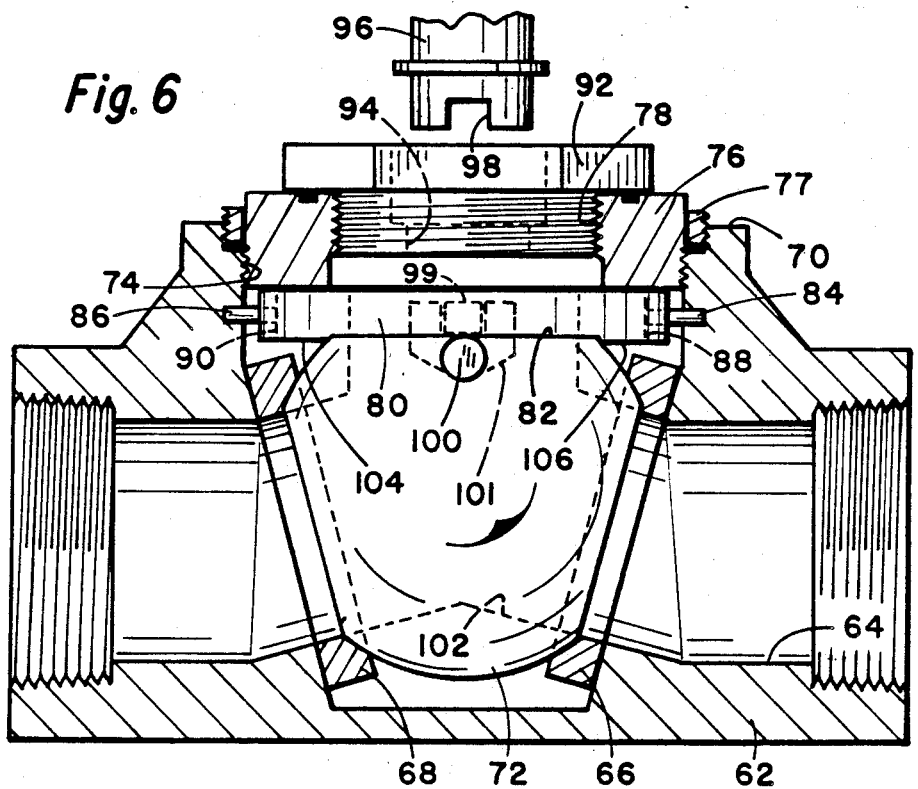
FIG. 6 is an elevational cross-sectional view of an alternate embodiment of the valve of this invention showing improved means of maintaining force of the valve ball against the valve seat.

FIG. 6 shows an alternate embodiment of the invention in which the body 10 is formed of one piece with the flow passageway 14 through it. In this embodiment the first seat 66 and the second seat 68 are inclined towards each other in the direction away from the body upper end 70. The seats 66 and 68 are free to slide with respect to the valve body. Ball 72, which has a generally spherical exterior surface, is positioned within the valve body and between 66 and 68. Due to the inclined arrangement of seat 66 and 68, downward force on ball 62 will cause sealing contact between the external spherical surface thereof and seats 66 and 68 to increase.

The body has internal threads 74 which receive the external threaded outer bonnet member 76. An annular threaded seal ring 77 is used to insure leakproof closure of the outer bonnet 76 relative to the valve body 62. The outer bonnet member has internal threaded openings 78 therein. The outer bonnet member 76 is annular is construction. The lower end of the outer bonnet engages a top seal 80 which, in turn, engages the upper annular surface 82 of ball 72. As the outer bonnet 76 is tightened applying force on top seal 80, downward force is supplied against ball 72 which attains increased sealing contact between the ball external surface and seats 66 and 68.

To prevent the rotation of top seal 30, pins 84 and 86 extend from the valve body 62 and are slideably received in slots 88 and 90 in the top seal (See FIG. 9).

The top of the valve is closed by an inner bonnet member 92 which, as described with reference to FIG. 1, has a reduced diameter opening 94 sealably and rotatably receiving a stem 96. The lower end of stem 96 has a slot 98 which removably contacts a ball rotation pin 99 in the ball 72 so that by rotation of stem 96 ball 72 is rotatably positioned.

In the arrangement of FIG. 6, if fluid pressure in the line to which the valve is attached is removed, the outer bonnet 76 can be removed, after which all interior parts of the valve, including ball 72 and seals 66 and 68, can be removed for repair or replacement without removing the valve body from the line.

An annular threaded seal ring 77 is used to insure leakproof closure of the outer bonnet 76 relative to the valve body 62.

It is desirable that increased force between the ball 72 and seat 66 and 68 is attained when ball 72 is rotated to the closed position, that is, wherein the flow passageway 102 is out of alignment with the valve body flow passageway 64. For this reason the top seal 80 is provided with increased thickness portions 104 and 106 at opposite points on the seal. (See FIGS. 10 and 11) These increased thickness portions 104 and 106 match with pin portions 100 of the pin supports 101 when the ball is in the closed position. This affect is achieved by the pins 100 extending exteriorly of ball 72 as shown in FIG. 5. Thus, when the ball 72 is rotated to the fully closed position, the ball is displaced downwardly increasing the sealing contact with the seat 66 and 68.

Figure 12:
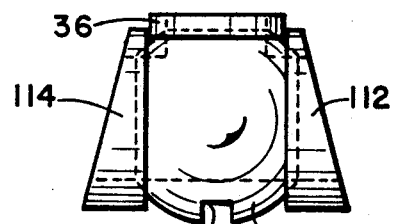
FIG. 12 is a fragmentary external view of the ball, top seal and valve seats such as may be employed in the valve of FIG. 1 in which the seats are of a triangular cross-sectional design for improved sealing contact between the ball and the valve seats.
Figure 8:
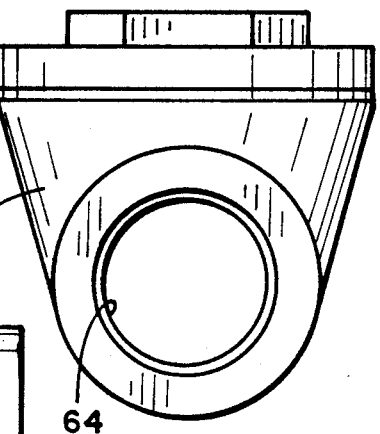
FIG. 8 is an external end view of the valve of FIG. 6. Both
Figure 7:
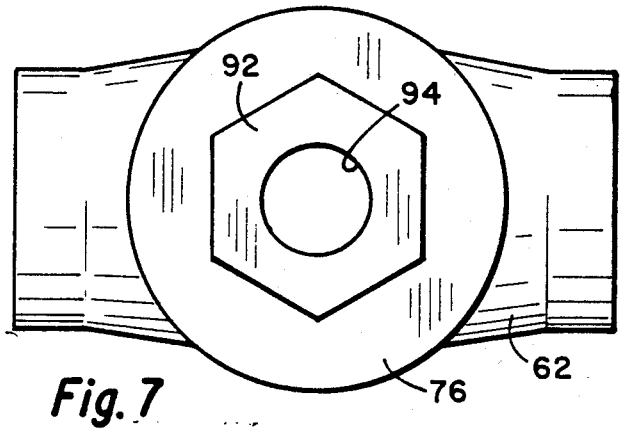
FIG. 7 is an external top plan view of the valve of FIG. 6.

FIG. 12 shows diagrammatically a means of utilizing the elevational displacement of the ball 24 of FIG. 1 achieved by the trunnion member 58 to increase sealing contact between the ball and seats. In FIG. 12, seats 112 and 114 are, in cross-section, of trapezoidal shape. These seats have outer inclined surfaces which match correspondingly inclined surfaces (not shown) in the valve body. Seats 112 and 114 are free to slide within the valve body so that when the ball 24 is urged upwardly increased sealing contact is attained between the external spherical surface of the ball and seats 112 and 114. This feature also has the advantage of keeping sealing force to a minimum except when the valve is "closed," resulting in less seal wear and easier operation.

FIG. 15 shows the arrangement for pivotally supporting a clapper member 30 within the valve ball 72 which has a diverted pathway therethrough and which is useable with inclined seals 68 (only one of which is shown). The clapper pivots about pin 32.

FIGS. 16 and 17 show a preferred manner of supporting a clapper member 116 in the valve ball as compared to the arrangement of FIG. 15. The clapper 116 is pivoted to an arm 118 by a hinge pin 122. The arm 118 has an integral flat portion 120 which attaches to the bottom surface of ball control pin 99 by means of bolts 121. In this manner, when the valve of FIG. 6 is closed, the inner bonnet portion 92 may be removed, exposing the open top of ball 72 after top seal 80 is removed. This assumes that the valve of FIG. 6 is equipped with the check valve feature of FIG. 15. The ball control pin 99 may be lifted out, bringing with it clapper 116 so the clapper can be repaired or replaced.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity it is manifest that many changes may be made in details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A combination plug and two-way check and plug valve comprising:
    a valve body having a flow passageway therethrough and means to connect other fluid flow members thereto with such passageway in series therebetween, the body having an opening in the top thereof communicating with said passageway;
    a first and a second valve seat in said body, each seat having a flow passageway therethrough, the seats being spaced apart and the flow passageways therethrough being in communication with said valve body flow passageway;
    a ball member rotatably received in said body between said seats, the ball member having a flow passageway therethrough which is alignable by rotatably positioning the ball with said passageways in said seats, the ball having a top and bottom and having a top opening therein communicating with said passageway therethrough;
    a clapper pivotally supported within said ball member and pivotal to a closed position blocking said passageway therethrough and to an open position opening said passageway therethrough;
    a bonnet member removably closing said body top opening and having a smaller diameter opening therethrough;
    stem means rotatably received in said bonnet member smaller diameter opening and removably affixed to said ball; and
    means external of said valve body to rotate said stem means and thereby said ball whereby said ball may be rotated to a first position to align the said passageway therethrough with said passageways through said seats and valve body to permit the flow of fluid in one direction, said clapper blocking fluid flow in the opposite direction, and rotation to a second position to align the said passageway therethrough with said passageway through said seats and valve body to permit the flow of fluid in the opposite direction, said clapper blocking counter fluid flow, and rotated to a third position wherein said passageway therethrough is out of alignment with said passageway through said seals and body to block fluid flow in either direction through said body, and wherein in said third position , said bonnet may be removed to expose said ball and to permit access to clapper.

2. A combination plug and two-way check valve according to claim 1 including:
    top seal means between said ball and said bonnet member.

3. A combination plug and two-way check valve according to claim 2 including means of displacing said ball in the direction towards said top seal means when said ball is rotated to said third, fully closed position.

4. A combination plug and two-way check valve according to claim 3 wherein said means of displacing said ball in the direction towards said top seal means when said ball is rotated to said third, fully closed position includes an arcuate of slot formed in the bottom of said ball and a trunnion member extending vertically upwardly from the interior bottom of the valve body, the trunnion being of rectangular cross-sectional configuration taken in a horizontal plane, the length of the rectangular cross-sectionad trunnion being less than the width of said arcuate slot, said trunnion being received in said arcuate slot.

5. A combination plug and two-way check valve according to claim 2 wherein said bonnet member is in the form of an outer bonnet member having a large diameter threaded opening therethrough, and an inner bonnet member having a threaded external cylindrical surface threadably received in said outer bonnet member, said inner bonnet member having said stem means therein, and wherein said top seal is annular, having a large diameter opening therein in register with said large diameter opening in said top of said ball whereby said inner bonnet member may be removed to expose access to the said clapper member within said ball.

6. A combination plug and two-way check valve according to claim 5 including means to permit longitudinal displacement, but to prevent the rotation of said top seal when said outer bonnet member is rotatably threaded onto said body.

7. A combination plug and two-way check valve according to claim 1 wherein said first and second valve seats are inclined toward each other in the direction away from said body top opening and wherein said bonnet member includes means of applying force against the top of said ball to thereby force said ball into increased force of contact with said valve seats.

8. A combination plug and two-way check valve according to claim 7 wherein said valve seats are free to slide against the interior of said valve body in response to increased force applied against the top of said ball.

* * * * *